US010139522B2

(12) United States Patent
Marullo et al.

(10) Patent No.: US 10,139,522 B2
(45) Date of Patent: *Nov. 27, 2018

(54) SILICONE ELASTOMER-SILICONE HYDROGEL HYBRID CONTACT LENSES

(71) Applicant: CooperVision International Holding Company, LP, St. Michael (BB)

(72) Inventors: Rachel Marullo, Oakland, CA (US); Victoria Tran, San Leandro, CA (US); Sarah Tao, Pleasanton, CA (US); Arthur Back, Danville, CA (US); Hang Le, San Jose, CA (US); Elissa Irma, San Ramon, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,311

(22) Filed: Mar. 29, 2017

(65) Prior Publication Data
US 2017/0307779 A1    Oct. 26, 2017

Related U.S. Application Data

(60) Provisional application No. 62/325,057, filed on Apr. 20, 2016.

(51) Int. Cl.
*G02B 1/04* (2006.01)
*G02C 7/04* (2006.01)
(Continued)

(52) U.S. Cl.
CPC ........ *G02B 1/043* (2013.01); *B29D 11/00048* (2013.01); *B29D 11/00067* (2013.01);
(Continued)

(58) Field of Classification Search
CPC .......... G02B 1/043; G02B 7/04; G02B 7/022; G02B 7/024; G02B 7/049;
(Continued)

(56) References Cited

U.S. PATENT DOCUMENTS 4,099,859 A     7/1978   Merrill
6,193,369 B1 *  2/2001   Valint, Jr. ........ B29D 11/00192
                                                   351/159.33

(Continued)

FOREIGN PATENT DOCUMENTS

WO    2014194431 A1    12/2014
WO    2016057867 A1     4/2016
WO    2016175950 A1    11/2016

OTHER PUBLICATIONS

U.S. Appl. No. 15/472,310, filed Mar. 29, 2017 (33 pages).
(Continued)

*Primary Examiner* — Jordan Schwartz
(74) *Attorney, Agent, or Firm* — Kilyk & Bowersox, P.L.L.C.

(57) ABSTRACT

A silicone elastomer-silicone hydrogel hybrid contact lens comprises a silicone elastomer layer adhered to silicone hydrogel layer by a delamination-resistant bond. The silicone hydrogel layer has a percent swell of about −5% up to about 20%. The silicone elastomer layer may have one or more objects embedded within it or adhered to its surface. Such objects may include variable-focus lenses and/or electronic components.

22 Claims, 2 Drawing Sheets

(51) Int. Cl.
  *B29D 11/00* (2006.01)
  *G02C 7/02* (2006.01)
  *B29K 83/00* (2006.01)
  *B29K 33/00* (2006.01)
  *B29K 105/00* (2006.01)

(52) U.S. Cl.
  CPC .. *B29D 11/00125* (2013.01); *B29D 11/00134* (2013.01); *B29D 11/00865* (2013.01); *G02B 1/04* (2013.01); *G02C 7/024* (2013.01); *G02C 7/04* (2013.01); *B29D 11/0025* (2013.01); *B29D 11/00807* (2013.01); *B29K 2033/12* (2013.01); *B29K 2083/00* (2013.01); *B29K 2105/0061* (2013.01)

(58) Field of Classification Search
  CPC ........ B29D 11/00067; B29D 11/00048; B29D 11/00134; G02C 7/04; G02C 7/022; G02C 7/024; G02C 7/049
  See application file for complete search history.

(56) References Cited

U.S. PATENT DOCUMENTS

| | | | |
|---|---|---|---|
| 8,215,770 | B2 | 7/2012 | Blum et al. |
| 8,298,392 | B2 | 10/2012 | Dorairaj et al. |
| 8,348,424 | B2 | 1/2013 | Pugh et al. |
| 8,865,789 | B2 | 10/2014 | Yao et al. |
| 8,874,182 | B2 | 10/2014 | Etzkorn et al. |
| 8,979,261 | B2 | 3/2015 | Goodenough et al. |
| 9,156,214 | B2 | 10/2015 | Norris et al. |
| 9,176,332 | B1 | 11/2015 | Etzkorn et al. |
| 9,278,489 | B2 | 3/2016 | Goodenough et al. |
| 2008/0002146 | A1* | 1/2008 | Stachowski ............... A61F 2/14 351/159.33 |
| 2008/0208335 | A1 | 8/2008 | Blum et al. |
| 2013/0158211 | A1* | 6/2013 | Zhang .................. C08G 77/388 525/474 |
| 2014/0055741 | A1 | 2/2014 | Havenstrite et al. |
| 2014/0276481 | A1 | 9/2014 | Pugh et al. |
| 2015/0036100 | A1 | 2/2015 | Gorne et al. |
| 2015/0055081 | A1* | 2/2015 | de Juan, Jr. ............ G02C 7/049 351/159.04 |
| 2015/0145155 | A1 | 5/2015 | Pugh et al. |
| 2015/0234204 | A1 | 8/2015 | Havenstrite et al. |
| 2016/0274377 | A1* | 9/2016 | Toner ...................... G02C 7/04 |

OTHER PUBLICATIONS

International Search Report and Written Opinion issued in corresponding International Patent Application No. PCT/GB2017/051109 dated Jun. 30, 2017 (12 pages).

* cited by examiner

SILICONE ELASTOMER-SILICONE HYDROGEL HYBRID CONTACT LENSES

This application claims the benefit under 35 U.S.C. § 119(e) of prior U.S. Provisional Patent Application No. 62/325,057, filed Apr. 20, 2016, which is incorporated in its entirety by reference herein.

FIELD

The field of the invention relates to silicone elastomer-silicone hydrogel hybrid contact lenses and their methods of manufacture.

BACKGROUND

Wearable electronics have received widespread attention in recent years, including electronic contact lenses containing electrical components that provide the lenses with an added functionality. Many applications for electronic contact lenses have been proposed, such as lenses having glucose sensors for diabetic patients (see, for example, U.S. Pat. No. 8,874,182), and lenses containing an electroactive element having a dynamic aperture (see, for example, U.S. Pat. No. 8,215,770). Electronic lenses have potential application for the correction of vision errors, such as myopia control and presbyopia, where a continuous range of focus (i.e. from near distance to far distance) is desired.

Commercially-available contact lenses made from hydrogels are preferred over lenses made from non-hydrogel materials because they are generally more comfortable. Hydrogel contact lenses are typically made by a cast molding process in which a polymerizable composition is dispensed into a contact lens mold and subjected to curing conditions, typically UV light or heat, that cause the monomer mixture to polymerize. The resulting lens is removed from the mold and hydrated to form a hydrogel, which typically comprises from about 20% to 60% water by weight. During the hydration process the lens swells appreciably in size. A non-swelling material, such as electronic components, incorporated into the lens during the curing step can cause uneven swelling of the hydrogel material upon hydration resulting in damaged or distorted lenses that are unsuitable for ophthalmic use.

Additional background publications include U.S. Pat. Pub. No. 2014/0055741, U.S. Pat. Pub. No. 2015/0145155, U.S. Pat. No. 9,176,332, U.S. Pat. Pub. No. 2015/0234204, U.S. Pat. Pub. No. 2015/0036100, U.S. Pat. No. 4,099,859, and PCT Publication No. WO/2014/194431.

SUMMARY

In one aspect, the invention provides a silicone elastomer-silicone hydrogel hybrid contact lens comprising a silicone elastomer layer comprising an anterior side and a posterior side; and a silicone hydrogel layer having a percent swell of about −5% up to about 20% adhered to the posterior side of the silicone elastomer layer. A delamination-resistant bond is present between the silicone elastomer layer and the silicone hydrogel layer.

Another aspect of the invention is a method of manufacturing a silicone elastomer-silicone hydrogel hybrid contact lens comprising cast molding a first curable composition in a first mold assembly to form a first layer of the silicone elastomer-silicone hydrogel hybrid contact lens. The first mold assembly comprises a first mold member defining an anterior side of the first layer and a second mold member defining the posterior side of the first layer. The first mold assembly is disassembled to provide the first layer adhered to only one of the first and second mold members. A second curable composition is cast molded in a second mold assembly to form a second layer of the silicone elastomer-silicone hydrogel hybrid contact lens. The second mold assembly comprises the mold member to which the first layer is adhered and a third mold member. The second mold assembly is disassembled to provide a silicone elastomer-silicone hydrogel hybrid contact lens comprising: i) a silicone elastomer layer comprising an anterior side and a posterior side; ii) a silicone hydrogel layer adhered to the posterior side of the silicone elastomer layer; and a delamination-resistant bond between the silicone elastomer layer and the silicone hydrogel layer.

DETAILED DESCRIPTION

Disclosed herein is a silicone elastomer-silicone hydrogel hybrid contact lens. The silicone elastomer-silicone hydrogel hybrid contact lens can be suitable for housing electronics and/or other non-swellable components. The contact lens comprises a silicone elastomer layer and a silicone hydrogel layer adhered to the posterior side of the silicone elastomer layer. The silicone hydrogel layer can be relatively thick (e.g., from 1 micron to 100 microns). The silicone hydrogel layer can have a low swell factor (e.g., from −5% to less than 10%). The silicone elastomer layer can be adhered to the silicone hydrogel layer by a delamination-resistant bond.

Silicone elastomers, which are also referred to in the art as silicone rubbers, are materials based on polyorganosiloxanes, such as, for example, polydimethylsiloxanes (PDMS). The silicone elastomer layer may consist of, or consist essentially of, a cured silicone elastomer. For example, the silicone elastomer layer may be free of any polymeric component other than the polyorganosiloxanes. In some examples, the silicone elastomer layer may contain an additive(s) such as a tint, a UV filter, or a lubricity enhancing agent. The silicone elastomer layer typically has a water content less than 1 wt. % based on the total weight of that layer. In some examples, the silicone elastomer layer has a water content less than 0.5 wt. %, or less than 0.3 wt. %, such as from 0 wt % to 0.9 wt %. The silicone elastomer layer has adequate optical clarity for use as a component in a contact lens. In some examples, light transmittance across the range of 500 nm to 780 nm, or 381 nm to 780 nm, is at least 80%, 85%, 90%, 95% or 97% (measured in accordance with ISO 18369). In one example, the silicone elastomer layer has a Young's modulus of at least 0.3 MPa or 0.5 MPa up to about 1.5 MPa or 2.0 MPa, as measured by an ANSI Z80.20 standard using an Instron Model 3342 or Model 3343 mechanical testing system, or equivalent. Throughout this disclosure, a reference to "an example" or "a specific example" or similar phrase, is intended to introduce a feature or features of the hybrid contact lens, or component of the hybrid contact lens, or method of manufacture (depending on context) that can be combined with any combination of previously-described or subsequently-described examples (i.e. features), unless a particular combination of features is mutually exclusive, or if context indicates otherwise. Curable formulations for forming the silicone elastomer layer include MED 6015, MED 6755 and MED 6033, from NuSil Technology, and SYLGARD elastomers from Dow Corning. The silicone elastomer formulations may be cured in accordance with the manufacturer's recommendations.

The silicone elastomer layer may have any dimensions and shape suitable for its intended purpose. Thus, as used herein, the term "layer" is not restricted to any particular dimensions or shape or thickness. Generally, the silicone elastomer layer comprises an anterior side and a posterior side (i.e. the side of the silicone elastomer layer that faces a patient's cornea when the lens is worn). In one example, the silicone elastomer layer is lens-shaped, meaning that the posterior side has a concave curvature corresponding to the curvature of a patient's cornea and an anterior (i.e. front) side with a convex curvature. In another example, the silicone elastomer layer has a posterior side that is flat. In yet another example, the silicone elastomer layer has a curvature that is shallower than the curvature of the cornea. The silicone elastomer layer may be shaped using any suitable method such as cast molding, injection molding, or lathing.

The silicone hydrogel layer is formed by curing a polymerizable composition comprising at least one siloxane monomer and at least one hydrophilic monomer. The term "monomer", as used herein, refers to any molecule comprising at least one polymerizable group (e.g. vinyl group, acrylate group, methacrylate group, etc.) capable of reacting with other molecules that are the same or different, to form a polymer or copolymer. Thus, the term, as an option, encompasses polymerizable pre-polymers and/or macromonomers. There is no size-constraint of the monomer unless indicated otherwise. A cross-linking agent is a monomer having two or more polymerizable groups. As used herein, a "vinyl-containing" monomer is any monomer that has a polymerizable carbon-carbon double bond (i.e., a vinyl group) present in its molecular structure, where the carbon-carbon double bond of the vinyl group is less reactive than the carbon-carbon double bond present in an acrylate or a methacrylate polymerizable group under free radical polymerization. Thus, while a carbon-carbon double bond is present in acrylate groups and methacrylate groups, as used herein, such groups are not considered to be "vinyl groups". Thus, for example, of the monomers described below in the examples section, only the monomer of Structure VIII is considered to be a vinyl-containing monomer. A "siloxane monomer" contains at least one Si—O group. Polymerizable compositions and methods for forming silicone hydrogel contact lenses are well known in the art (e.g. U.S. Pat. No. 8,865,789).

The silicone hydrogel layer provides a hydrophilic coating on at least a portion of the silicone elastomer layer. The presence of the silicone hydrogel layer improves the biocompatibility of the overall lens and allows it to have adequate on-eye movement and comfort when worn by a patient. Adequate on-eye movement of the silicone elastomer-silicone hydrogel hybrid contact lens can be determined by slit lamp evaluation using a standard push-up test. In one example, the lens can be pushed up by at least 1, 2, 4 or 5 mm and has a push-up speed recovery speed of at least 0.1 mm/s, 0.2 mm/s, or 0.4 mm/s up to about 2 mm/s, or 3 mm/s or 4 mm/s, as determined using the method described by Wolffsohn et al (Cont. Lens Anterior Eye. (2009) 32:37-42).

In one example, the silicone hydrogel layer has a center thickness of at least about 1 μm, 5 μm, 10 μm, or 25 μm up to about 50 μm, 75 μm or 100 μm. As used herein, center thickness refers to the cross-sectional thickness of the center of the silicone hydrogel layer when fully hydrated, as measured using a Rehder Moedl ET-3 electronic thickness gauge or equivalent thickness gauge instrument. Throughout this disclosure, when a series of lower limit ranges and a series of upper limit ranges are provided, all combinations of the provided ranges are contemplated as if each combination were specifically listed. For example, in the above listing of center thicknesses, all twelve possible thickness ranges are contemplated (i.e. 1 μm to 50 μm, 1 μm to 75 μm, etc., 25 μm to 75 μm, and 25 μm to 100 μm). Also, throughout this disclosure, when a series of values is presented with a qualifier preceding the first value, the qualifier is intended to implicitly precede each value in the series unless context dictates otherwise. For example, for the values listed above, it is intended that the qualifier "at least about" implicitly precedes 5 μm, 10 μm and 25 μm, and the qualifier "to about" implicitly precedes both 75 μm and 100 μm. The thickness of the silicone hydrogel layer may be uniform throughout the layer or it may be non-uniform, for example, it may taper towards the periphery of the lens. The silicone elastomer-silicone hydrogel hybrid contact lens has the appropriate refractive correction for the wearer, and may be a spheric lens, a toric lens, or a multifocal lens. The refractive index, curvature, and thickness of the contact lens may be contributed to by any layer of the lens.

After a silicone hydrogel polymerizable composition is cured, it is typically washed in water and/or organic solvent to remove unreacted components from the cured material prior to packaging. This processing step is referred to as extraction and hydration or "E&H". We have found that a significant differential swell between the silicone hydrogel layer and the silicone elastomer layer of the hybrid contact lens may cause unacceptable distortion during E&H and, in some cases, the silicone hydrogel layer and the silicone elastomer layers can separate from each other. Reducing the percent swell of the silicone hydrogel layer can increase the yield of acceptably-shaped lenses. As used herein, the "percent swell" of the silicone hydrogel layer is determined by the formula: $(D_w-D_d/D_w) \times 100$, where $D_d$ is the chord diameter of a dry (unwashed)+1.0 diopter contact lens consisting of the cured polymerizable silicone hydrogel composition (i.e. the cured silicone hydrogel is not bonded to the silicone elastomer layer), and $D_w$ is the chord diameter of the +1.0 diopter contact lens after it has been washed and hydrated. In various examples, the silicone hydrogel layer has a percent swell of about −5%, 0%, or 5% up to about 10% or 15% or 20%. Silicone hydrogels having a percent swell within this range are characterized herein as having a "low swell factor".

The percent swell of a silicone hydrogel may be varied by varying the amount of cross-linking agents included in the polymerizable composition for the silicone hydrogel. Increasing the amount of cross-linking agents generally decreases the percent swell of the resulting silicone hydrogel layer. For example, a silicone hydrogel composition typically comprises at least one siloxane monomer, at least one hydrophilic monomer, and at least one cross-linking agent having a molecular weight of less than 500 Daltons, referred to herein as a "low molecular weight cross-linking agent". Typically, the low molecular weight cross-linking agent(s) comprise about 0.2 wt. % or 0.5 wt. % up to about 1.0 wt. % or 1.5 wt. % of the polymerizable composition, where total weight percent is based on the weight of the polymerizable components included in the composition (i.e. the weight of diluents and other non-polymerizable components is excluded). In specific examples, the polymerizable compositions used to form the silicone hydrogel layer of the contact lenses described herein have at least 1.5 wt. % or 2.0 wt. % up to about 3.0 wt. %, 4.0 wt. % or 5.0 wt. % of at least one low molecular weight cross-linking agent. References herein to 'at least one' of a type of ingredient refer to both a) a single ingredient, and b) a combination of two or more ingredients of the same type. In specific examples, the at least one low molecular weight cross-linking agent is ethylene glycol dimethacrylate (EGDMA), or triethylene glycol dimethacrylate (TEGMDA), or triethyleneglycol divinyl ether (TEGDVE), or a combination thereof.

Silicone hydrogels having low swell factor may also be achieved by the inclusion of a diluent in the polymerizable composition. As used herein, the term "diluent" refers to a non-reactive ingredient of the polymerizable composition that can be washed out of the silicone hydrogel after it has been cured. In one example, the silicone hydrogel polymerizable composition comprises a silicone-containing diluent. In a specific example, the silicone-containing diluent is a PDMS polymer or a PDMS-containing copolymer. In a further specific example, the silicone-containing diluent is a copolymer of PDMS and polyethylene glycol (i.e. PDMS-co-PEG).

The silicone hydrogel layer may have an equilibrium water content (EWC) of at least about 10 wt. %, 20 wt. %, or 30 wt. %, and up to about 40 wt. %, 50 wt. %, or 60 wt. %. To measure EWC, excess surface water is wiped off of a fully hydrated silicone hydrogel layer (i.e. not bonded to the silicone elastomer layer) and the silicone hydrogel layer is weighed to obtain the hydrated weight. The silicone hydrogel layer is dried in an oven at 80° C. under a vacuum, and weighed. The weight difference is determined by subtracting the weight of the dry silicone hydrogel layer from the weight of the hydrated layer. The wt. % EWC of the silicone hydrogel layer is =(weight difference/hydrated weight)×100.

In examples where cross-linking of the silicone hydrogel is increased to reduced distortion when bonded to the silicone elastomer layer, the EWC of the silicone hydrogel layer may be in the range of about 15 wt. % to about 40 wt. %

The silicone elastomer layer and the silicone hydrogel layer are adhered together by a delamination-resistant bond. As used herein, the term "delamination-resistant" means that the bond between the silicone elastomer layer and the hydrated silicone hydrogel layer, remain adhered to each other after autoclaving at 121-124° C. for 30 minutes. Various approaches can be used to form a delamination-resistant bond between the silicone elastomer layer and a low swell factor silicone hydrogel layer. In one approach, the delamination-resistant bond is formed by an elastomer-swellable component of the silicone hydrogel layer that permeates into the silicone elastomer layer. As used herein, the term "elastomer-swellable component" refers to a monomer present in the polymerizable composition used to form the silicone hydrogel layer that is capable of swelling the silicone elastomer used to form the silicone elastomer layer. Whether a given monomer is capable of swelling the silicone elastomer is determined by submerging an 11.5 mm×100 μm disk consisting of the cured silicone elastomer in the uncured liquid monomer at room temperature (20-25° C.) for 24 hours. At 24 hours, the disk is removed from the liquid monomer and its diameter is measured. The percent change in diameter is calculated by the equation $((D_{final}-11.5)/11.5)*100$, where $D_{final}$ is the diameter of the disk measured in mm at 24 hours. In specific examples, the elastomer-swellable component is capable of swelling a disk consisting of the silicone elastomer by at least 5%, 10%, or 15% up to about 25%, 30%, or 35%.

In some examples, the elastomer-swellable component has a hydrophilic-lipophilic balance (HLB) value of up to 4, or a molecular weight of up to 1,200 daltons (Da), or both an HLB value of up to 4 and a molecular weight of up to 1,200 Da. The HLB value of a monomer is calculated using the formula: $HLB=(20*MW_h)/MW_t$, where $MW_h$ is the molecular weight of the hydrophilic portion of the monomer, and $MW_t$ is the total molecular weight of the monomer. A monomer that has no hydrophilic portion has an HLB value of 0. A monomer may have more than one hydrophilic portion, in which case the molecular weight of each hydrophilic portion is added together in the HLB calculation. For example, in the monomer of Structure III below, referred to as FMM, the hydrophilic portions of the molecule are —OCH$_2$CH$_2$N— and —OCH$_2$CH$_2$O—, which have a combined molecular weight of 119 Da, and the total molecular weight of FMM is 1324 Da. Therefore, the HLB value of FMM is calculated as (20*119)/1324=1.8. In a specific example, the elastomer-swellable component has an HLB value of 0 to 3. In a further example, the elastomer-swellable component has a total molecular weight of less than 1,000, or less than 750. In the case of a polydisperse monomer, such as with some macromonomers, the term "molecular weight" refers to the absolute number average molecular weight of the monomer as determined by $^1$H NMR end-group analysis (NMR).

Exemplary elastomer-swellable siloxane monomers are described below in Example 4. In one example, the elastomer-swellable siloxane monomer comprises a single polymerizable group (i.e. it is monofunctional). In another example, the siloxane monomer comprises two or more polymerizable groups. In such an example, the siloxane monomer functions as a cross-linking agent, which may strengthen the bond between the silicone elastomer layer and the silicone hydrogel layer, thereby increasing delaminationresistance. Exemplary cross-linkable siloxane monomers include methacryloxypropyl terminated polydimethylsiloxanes, acryloxypropyl terminated polydimethylsiloxanes, vinyl terminated polydimethylsiloxanes, and polydimethylsiloxanes having two different types of polymerizable groups, such as methacryloxypropyl-terminated and vinyl-terminated polydimethylsiloxane.

In one example, the delamination-resistant bond comprises an interpenetrating polymer network (IPN) in which, during the formation of the silicone hydrogel, the elastomer-swellable component polymerizes around the silicone elastomer to form a polymer network that is interlocked with the silicone elastomer. In another example, the bond comprises a covalent bond between the elastomer-swellable component and the silicone elastomer, which can be achieved by including a platinum catalyst and an elastomer-swellable vinyl-containing cross-linking agent in the polymerizable silicone hydrogel composition, as described below. In some examples, the delamination-resistant bond between the silicone elastomer layer and the silicone hydrogel layer comprises both an IPN and a covalent bond between the elastomer-swellable component and the silicone elastomer.

Figure 8:
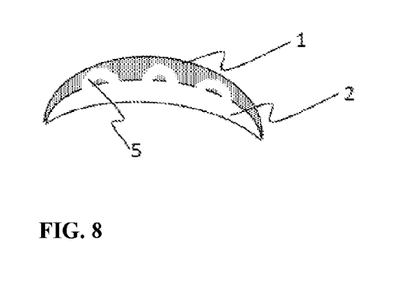
FIG. 8 depicts an example of a silicone elastomer-silicone hydrogel contact lens comprising silicone hydrogel-filled channels in the silicone elastomer layer.
Figure 9:
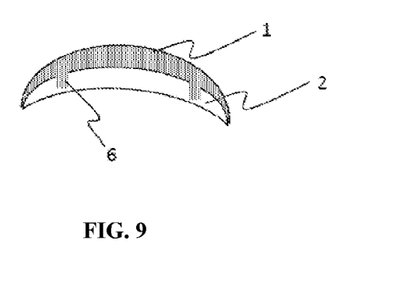
FIG. 9 depicts an example of a silicone elastomer-silicone hydrogel contact lens comprising silicone elastomer-filled channels in the silicone hydrogel layer.

In another approach for forming a delamination-resistant bond between the silicone elastomer layer and the silicone hydrogel layer, the delamination resistant bond comprises predetermined appendages or channels on the posterior side of the silicone elastomer layer that interconnect with respective channels or appendages formed in the silicone hydrogel layer. As used herein, the term "predetermined" is used to mean that the channels and appendages have a specified design. In other words, the channels and corresponding appendages are not formed randomly as in the case of an IPN. Predetermined channels and appendages can be achieved by forming the first layer, which can be either the silicone elastomer layer or the silicone hydrogel layer, with one or more channels on its surface that interfaces with the other (i.e. second) layer. When a liquid composition for the second layer is dispensed onto the first layer, it fills the one or more channels and during curing results in the formation of "appendages" corresponding (i.e. complementary) to the respective channels of the first layer. Conversely, the first layer may be formed to have one or more appendages on its surface. When a curable liquid composition for the second layer is dispensed onto the first layer, it flows around the appendages of the first layer thereby forming corresponding channels that interconnect with the appendages. For example, in reference to FIG. 8, a silicone elastomer layer, 1, may comprise one or more channels on its posterior side, which are filled by appendages, 5, of the silicone hydrogel layer, 2. In reference to FIG. 9, the silicone elastomer layer, 1, may comprise an appendage, 6, that corresponds to a channel on the anterior side of the silicone elastomer layer, 2. Appendages and corresponding channels may be provided in any desired configuration, dimensions and number that achieve a delamination-resistant bond. In some examples, it may be desired to have the two layers physically interlocked, such as depicted in FIG. 8. In other examples non-interlocking appendages and corresponding channels, such as depicted in FIG. 9, may be sufficient to provide a delamination-resistant bond. A channel may have a diameter in the micrometer range or in the millimeter range. Appendages and channels can be formed onto a surface of the silicone elastomer layer and/or silicone hydrogel layer by a variety of methods. For example, contact lens molds suitable for forming channels into a surface of a contact lens by a cast molding method are described in U.S. Pat. No. 9,278,489. In some examples, a mold designed for forming appendages or channels into a layer of a hybrid contact lens may be made using 3D-printing. In another method, laser micromachining can be used to form channels into one of the layers of the hybrid contact lens after it has been cured.

In another approach for forming a delamination resistant bond between the silicone elastomer layer and the silicone hydrogel layer, the two layers are individually cured and then bonded together. In one example, the bond is formed by oxygen plasma treatment of the posterior side of the silicone elastomer layer and/or the anterior side of the silicone hydrogel layer. The oxygen plasma treatment converts silane (Si—CH$_3$) groups on the surface of the treated layer to silanol (Si—OH) groups, which, when brought into contact with appropriate surface groups on the other layer (e.g. —OH or —COOH) condense to form a Si—O—Si bond between the two layers. As part of the oxygen plasma treatment, the surface to be treated may be coated with an additional silane-containing compound to promote bond formation. As used herein, a Si—O—Si bond between the silicone elastomer layer and the silicone hydrogel layer is referred to as a "plasma bond". Plasma bonding methods are well-known for assembling of PDMS-based parts (see e.g. U.S. Pat. No. 8,298,392). Another approach for binding a cured silicone hydrogel layer to a silicone elastomer layer is to use adhesives that are compatible with the two layers, do not adversely affect the desired properties of the lenses (e.g. modulus, ionoflux, optical clarity, etc.) and do not result in distortion when the silicone hydrogel layer is hydrated. A variety of adhesives known in the art may also be used to adhere the silicone elastomer layer and silicone hydrogel layers together after they have already been cured (see e.g. U.S. Pat. Publ. No. 20140276481).

Figure 1A:
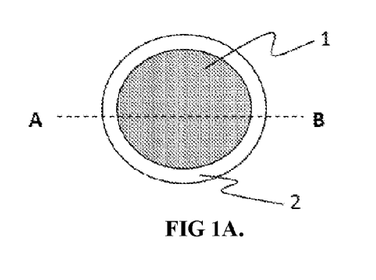
FIG. 1A depicts a topical/planar view of a silicone elastomer-silicone hydrogel hybrid contact lens comprising a circumferential hydrogel skirt.
Figure 1B:
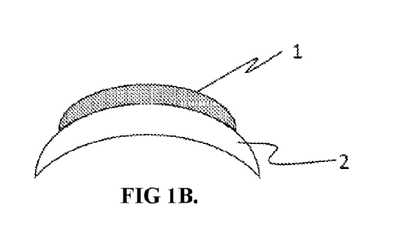
FIG. 1B depicts a cross-sectional side view of the contact lens of FIG. 1A through the sectional line A-B.
Figure 5:
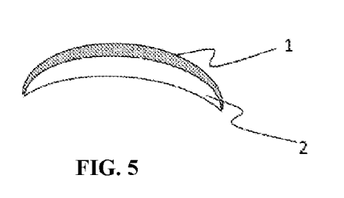
FIG. 5 depicts an example of a silicone elastomer-silicone hydrogel hybrid contact lens where the silicone elastomer layer and the silicone hydrogel layer have about the same diameters.

The silicone elastomer layer and the silicone hydrogel layer of the hybrid contact lens may have any configuration suitable for its intended purpose. Referring to FIG. 1A and FIG. 1B, in one example, the silicone hydrogel layer (2) of the contact lens has a chord diameter that is larger than the chord diameter of the silicone elastomer layer (1), thereby forming a circumferential skirt (i.e. annulus) of silicone hydrogel material around the periphery of the silicone elastomer layer. In one example, the chord diameter of the silicone hydrogel layer is about 1.0 mm, 2.0 mm, or 3.0 mm up to about 0.6 mm, 7.0 mm or 8.0 mm larger than the cord diameter of the silicone elastomer layer. In another example, referring to FIG. 5, the silicone elastomer layer (1) and the silicone hydrogel layer (2) have the same, or approximately the same, chord diameters. The silicone hydrogel layer has a posterior surface curvature suitable for corneal placement.

Figure 2:
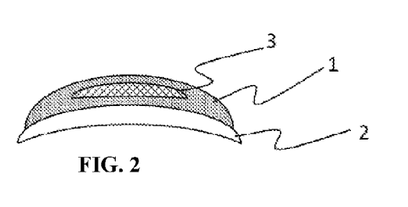
FIG. 2 depicts an example of a silicone elastomer-silicone hydrogel hybrid contact lens comprising a variable focus lens embedded within the silicone elastomer layer.
Figure 3:
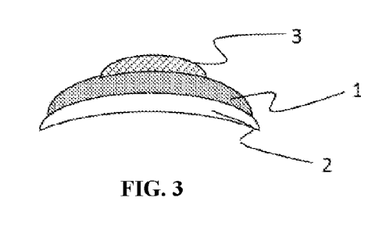
FIG. 3 depicts an example of a silicone elastomer-silicone hydrogel hybrid contact lens comprising a variable focus lens adhered to the anterior side of the silicone elastomer layer.
Figure 6:
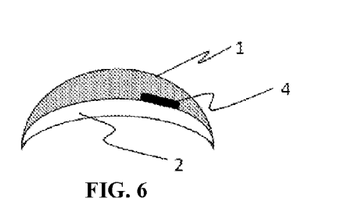
FIG. 6 depicts an example of a silicone elastomer-silicone hydrogel contact lens where the silicone elastomer layer has an electronic component adhered to its posterior side.
Figure 7:
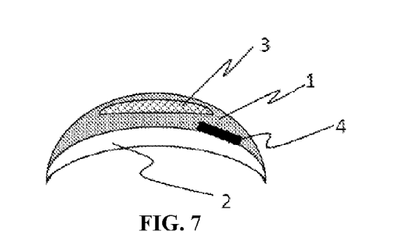
FIG. 7 depicts an example of a silicone elastomer-silicone hydrogel contact lens where the silicone elastomer layer has an embedded variable focus lens and an electronic component adhered to its posterior side.

The silicone elastomer-silicone hydrogel hybrid contact lens may further comprise an object embedded within the silicone elastomer layer or adhered to the anterior or posterior side of the silicone elastomer layer. In one example, the object may be a variable focus optical lens such as a liquid meniscus lens (see e.g. U.S. Pat. No. 8,348,424), an electro-wetting lens, a liquid crystal lens, or an electro-active lens (see e.g. US 2008/0208335). Other objects that may be embedded within a silicone elastomer layer or adhered to the anterior side of the silicone elastomer layer include electrodes, batteries, antennae, circuits, MEM devices, sensors, etc. An object may be embedded within the silicone elastomer layer by immersing the object within the liquid (i.e. uncured) silicone elastomer and then curing the elastomer to its desired shape, for example by cast molding. For example, as depicted in FIG. 2, the silicone elastomer-silicone hydrogel hybrid contact lens may comprise a silicone hydrogel layer (2), a silicone elastomer layer (1), and an object, such as a variable focus lens (3), embedded within the silicone elastomer layer. In another example, an object may be adhered to or partially embedded in the anterior side of the silicone elastomer layer by a mold transfer method, or by gluing the object onto the silicone elastomer after it has been cured. In one such example, the silicone elastomer-silicone hydrogel hybrid lens may have the configuration depicted in FIG. 3, in which a variable focus lens (3) is adhered to the anterior side of the silicone elastomer layer (1). As used herein, the phrase "partially embedded within" is intended to mean that the object is not fully embedded within the silicone elastomer layer as depicted in FIG. 2. For example, FIG. 6 depicts an electronic component (4) that is partially embedded by the silicone elastomer layer (1). FIG. 6 illustrates that the entire posterior side of the silicone elastomer layer need not be adhered to the silicone hydrogel layer, and that just a portion of the posterior side of the silicone elastomer layer may be adhered to the silicone hydrogel layer by a delamination resistant bond. In some examples, the silicone elastomer-silicone hydrogel hybrid contact lens comprises at least one objected embedded within the silicone elastomer layer and at least one object adhered to the anterior or posterior side of the silicone elastomer layer. One such example is depicted in FIG. 7.

Methods known in the art may be used to form the silicone elastomer layer and the silicone hydrogel layer separately. A liquid composition for each layer may be cured using conditions specific for the composition (e.g. thermal curing, UV curing, etc.) and formed into its desired shape such as by cast molding, lathing, 3-D printing etc. The preformed layers may then be adhered together using, for example, adhesive or plasma bonding.

Figure 10:
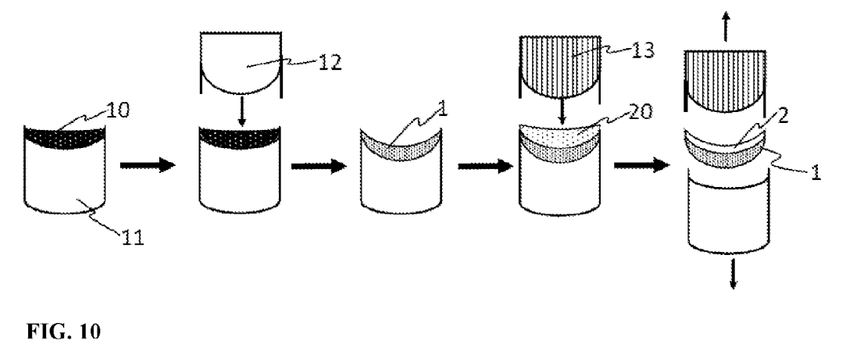
FIG. 10 depicts one example of a double-cast molding method for manufacturing a silicone elastomer-silicone hydrogel hybrid contact lens.
Figure 11:
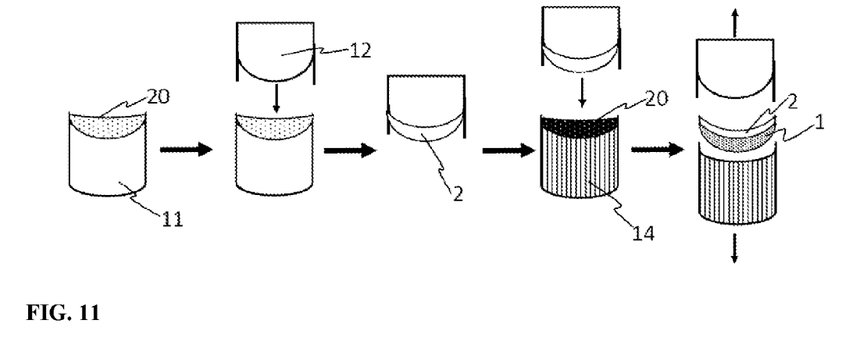
FIG. 11 depicts another example of a double-cast molding method for manufacturing a silicone elastomer-silicone hydrogel hybrid contact lens.

In examples where the delamination-resistant bond between the silicone elastomer layer and the silicone hydrogel is formed by an elastomer-swellable component of the silicone hydrogel layer or by interlocking appendages and corresponding channels, a double-cast molding method may be used to manufacture the lenses. In this method, a first curable composition is dispensed into a first mold member that defines the anterior side of the first layer. Typically, the first mold member has a concave molding surface (i.e. a female mold member). A second mold member defining the posterior side of the first layer is combined with the first mold member to form a first mold assembly that is subjected to curing conditions for the first curable composition. Typically, the second mold member has a convex molding surface (i.e. a male mold member). The mold assembly is disassembled (i.e. demolded) such that the first layer remains adhered to only one of the mold members. If the first layer is the silicone elastomer layer, it will typically be adhered to the first mold member. Conversely, if the first layer is the silicone hydrogel layer, it will typically be adhered to the second mold member. Next, the mold member, to which the first layer is adhered, is contacted with a second curable composition for the second layer of the silicone elastomer-silicone hydrogel hybrid contact lens and combined with a third mold member that is complementary to the mold member to which the first layer is adhered, thereby forming a second mold assembly. The second mold assembly is subjected to curing conditions for the second curable composition. The second mold assembly is then disassembled to provide the silicone elastomer-silicone hydrogel hybrid contact lens. FIG. 10 and FIG. 11, illustrate the above-described double-cast molding method. Referring to FIG. 10, a curable composition for a silicone elastomer, 10, is dispensed into a first mold member, 11, which is a female mold member. A second mold member, 12, which is a male mold member, is coupled to the female mold member. The resulting mold assembly is subjected to curing conditions to form the silicone elastomer layer. The first and second mold members are separated to result in the silicone elastomer layer, 1, adhered to the first mold member. A second curable composition, 20, which in this case is a polymerizable composition for a silicone hydrogel, is dispensed onto the silicone elastomer layer, and a third mold member, 13, is coupled to the first mold member to form a second mold assembly. The second mold assembly is subjected to curing conditions that form the silicone hydrogel layer, 2. The second and third mold members are separated and the hybrid contact lens is removed and subjected to any post curing processing steps such as extraction and hydration. The double-cast molding method depicted in FIG. 11, is substantially the same as that described above for FIG. 10, except that a curable composition for a silicone hydrogel, 20, is dispensed into the first mold member, 11. After curing, the resulting silicone hydrogel layer, 2, remains adhered to the second mold member, 12, which is then coupled to a third mold member, 14, that contains a second curable composition, 20, for the silicone elastomer layer.

The molding surface of the first mold member may have a different surface energy from that of the second mold member to result in preferential adherence of the first layer to one of the mold members. For example, the first mold member may have a molding surface that is more polar than the molding surface of the second mold member. Examples of polar molding materials are known in the art (see e.g. U.S. Pat. Nos. 9,156,214 and 8,979,261). In a specific example, the first and second mold members are formed from polypropylene and the molding surface of the mold member to which the first layer is to adhere is treated with oxygen plasma to make it more polar than the molding surface of the second mold member. In another example, the first and second mold members are formed from polypropylene and the molding surface of the mold member to which the first layer is to adhere is coated with a polar material, such as polyvinyl alcohol. In yet other examples, the first and second mold members may be made from different materials having different polarities.

As described previously, in some examples, one of the mold members may contain channels or appendages on its mold-forming surface that result in complementary appendages or channels on the side of the first layer that interfaces with the second layer. The channels and corresponding appendages may be any dimension or configuration that achieves a delamination resistant bond. In one example, the channels have a diameter of about 0.1 mm up to about 1.0 mm.

Figure 4:
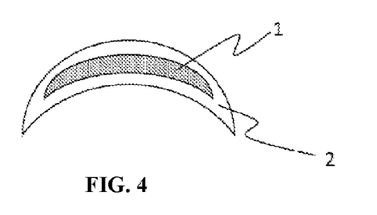
FIG. 4 depicts an example of a silicone elastomer-silicone hydrogel hybrid contact lens where a hydrogel layer is adhered to both the anterior and posterior sides of the elastomer layer.

In other examples where the delamination-resistant bond between the silicone elastomer layer and the silicone hydrogel of the hybrid lenses is formed by an elastomer-swellable component of the silicone hydrogel layer, the silicone elastomer layer may be formed into its desired shaped and then the silicone hydrogel layer may be formed by coating, such as spray coating or dip-coating, the silicone elastomer layer with a polymerizable silicone hydrogel composition, curing the silicone hydrogel, and optionally lathing the silicone hydrogel layer to the desired shape. In another example, the silicone elastomer layer may be placed in a mold together with a polymerizable composition for the silicone hydrogel layer and subjected to curing conditions for the silicone hydrogel. In this example, the silicone elastomer layer may be positioned within the mold assembly such that the silicone hydrogel layer forms around and fully encapsulates the silicone elastomer layer, such that the resulting elastomer-silicone hydrogel hybrid contact lens may be considered to comprise a silicone hydrogel layer adhered to both the anterior side and posterior side of the silicone elastomer layer, as depicted in FIG. 4.

As described above, one or more elastomer-swellable component of the polymerizable hydrogel composition may interpenetrate into the silicone elastomer layer to form an interpenetrating polymer network resulting in the delamination-resistant bond. In some examples, the delamination-resistant bond may also comprise covalent attachment. Covalent attachment between the silicone elastomer layer and the silicone hydrogel layer may be achieved by including a catalyst, such as a platinum catalyst, and an elastomer-swellable vinyl-containing cross-linking agent in the polymerizable hydrogel composition. In one example, the elastomer-swellable vinyl-containing cross-linking agent is a divinyl siloxane. In a specific example, the divinyl siloxane is a divinyl-functionalized PDMS. In other examples, the elastomer-swellable vinyl-containing cross-linking agent may comprise a single vinyl group and a different (i.e. non-vinyl) polymerizable group, such as an acrylate or a methacrylate group.

After the silicone elastomer layer and silicone hydrogel layer have been bonded together using any of the above-described manufacturing methods, the hybrid contact lens may be washed to extract unreacted or partially reacted ingredients from the silicone hydrogel layer and to hydrate the silicone hydrogel layer. Extraction and hydration methods for silicone hydrogel contact lenses are known in the art (see e.g. U.S. Pat. No. 8,865,789). In some examples, it may be unnecessary to wash the silicone hydrogel layer prior to use by an end consumer. In such examples, the silicone elastomer-silicone hydrogel hybrid contact lens may be packaged in the unhydrated state (dry) and the end-consumer may hydrate the silicone hydrogel layer immediately prior to use by wetting the lens with an artificial tear solution. This can be advantageous in examples where the hybrid contact lens comprises a functional component, such as electronic components, that could become nonoperational if immersed in a saline solution for an extended period. In other examples, the silicone hydrogel layer may be washed to remove unreacted materials and then dried prior to final packaging of the hybrid contact lens. In yet other examples, the silicone hydrogel layer is washed and the hybrid contact lens is packaged with the silicone hydrogel layer in a hydrated state.

Prior to packaging, the hybrid contact lens may be subjected to further processing. For example, in embodiments where the silicone elastomer layer forms the anterior surface of the contact lens, it may be subjected to a treatment that makes the anterior surface hydrophilic. For example, the silicone elastomer layer may be treated with plasma or coated with a hydrophilic coating to make the anterior surface of the contact lens more wettable. In some examples, the silicone hydrogel layer may also include a surface treatment, such as a plasma treatment or a surface coating, if desired.

The silicone elastomer-silicone hydrogel hybrid contact lens may be placed into any suitable container, such as a blister package, glass vial, or other appropriate container, all referred to herein as "packages". A packaging solution, such as a phosphate- or borate-buffered saline, may be optionally added to the container if the hybrid lens is to be packaged with the silicone hydrogel layer in its hydrated state. The package is sealed, and the sealed hybrid contact lens is sterilized by sterilizing amounts of radiation, including heat or steam, such as by autoclaving, gamma radiation, e-beam radiation, ultraviolet radiation, etc. The final product is a sterile, packaged ophthalmically-acceptable silicone elastomer-silicone hydrogel hybrid contact lens.

The following Examples illustrate certain aspects and advantages of the present invention, which should be understood not to be limited thereby.

Example 1: Double-Cast Molding to Form Silicone Hydrogel and Silicone Elastomer Hybrid Contact Lenses About 95 uL silicone elastomer (MED-6015, NuSil) was dispensed into oxygen plasma-treated female polypropylene contact lens mold members. Male mold members made from un-treated polypropylene was fitted on top of each female mold to provide a first mold assembly that was placed in an oven set at a temperature set at 100° C. for 40 minutes. Upon opening the mold assemblies, the partially-cured elastomer lenses remained attached to the female mold members. Next, about 95 uL of a polymerizable silicone hydrogel composition was dispensed into each female mold member on top of the elastomer lens. The polymerizable compositions used were the same compositions that are used to form stenfilcon A, enfilcon A, and comfilcon A. A male mold member was placed in contact with each of the female mold members containing the cured elastomer and the polymerizable composition to form a second mold assembly. The mold assemblies were cured using heat or ultraviolet light, as required by each of the different polymerizable compositions. After curing, the hybrid lenses were removed from the molds and subjected to extraction and hydration. Lenses that withstood extraction and hydration were packaged and autoclaved. Only stenfilcon A lenses withstood extraction, hydration and autoclave.

Example 2: Swellability of Silicone Elastomer in Hydrogel Polymerizable Compositions We hypothesized that the stenfilcon A polymerizable composition penetrated into and formed an interpenetrating polymer network with the silicone elastomer during curing, thereby forming a bond between the silicone hydrogel layer and the silicone elastomer layer, which prevented the two layers from delaminating during extraction and hydration. To test whether stenfilcon A penetrates into silicone elastomer significantly more than the other hydrogel polymerizable compositions from Example 1, we immersed an 11.5 mm (diameter)×100 µm disk made from cured MED6015 into each of the polymerizable compositions at room temperature until swelling of the disk was complete (15 minutes up to 24 hour). The change in disk diameter was measured and the percent swell was calculated as the percent increase in diameter. The results, shown in Table 1, indicate that the stenfilcon A polymerizable composition swelled the MED6015 appreciably more than the other polymerizable compositions.

TABLE 1

MED6015 Swell In Lens Monomer Mixes

| Polymerizable Composition | % Swell |
|---|---|
| Stenfilcon A | 8% |
| Enfilcon A | 3% |
| Comfilcon A | 4% |

Example 3: Swellability of Silicone Elastomer in Hydrogel Monomers

We further tested whether each individual monomer from the stenfilcon A polymerizable composition could penetrate into MED6015 disks using the same method described in Example 2. Ethanol and ethyl acetate were also included. Ethanol is known to not swell MED6015 significantly, while ethyl acetate is a good solvent for silicone elastomers. The results are shown in Table 2. X22-1622 refers to a siloxane monomer of structure I:

X22-1640 refers to a siloxane monomer of structure II, in which m=5-6, n=80-90, and p=7-8

TABLE 2

MED6015 Swell In Liquid Monomers

| Liquid Monomer | % Swell |
|---|---|
| X22-1622 | 23% |
| X22-1640 | 1% |
| N-vinyl-N-methylacetamide (VMA) | 0% |
| Methyl methacrylate (MMA) | 21% |
| Ethanol | 2% |
| Ethyl acetate | 24% |

Example 4: Swellability of Silicone Elastomer in Siloxane Monomers

We tested the ability of additional siloxane monomers to penetrate into MED6015 disks using the same method described in Example 2. The % changes in diameter of the MED6015 disks are shown in Table 3, along with the average molecular weight and approximate HLB value of each monomer. The molecular structure of each monomer tested is provided below the table, except for the structures of X22-1622 and X22-1640, which are provided above.

TABLE 3

MED6015 Swell In Siloxane monomers

| Siloxane monomer | % Change in Diameter | MW Wt. (in Daltons) | HLB Value | Structure No. |
|---|---|---|---|---|
| X22-1622 | 23% | 585 | 2.1 | I |
| X22-1640 | 1% | 8000-11000 | 0.7 | II |
| FMM | 4% | 1324 | 1.8 | III |
| TRIS | 28% | 423 | 0 | IV |
| SiGMA | 3% | 436 | 4.1 | V |
| MCS-M11 | 22% | 800-1200 | 0 | VI |
| MCR-M07 | 24% | 600-800 | 0 | VII |

TABLE 3-continued

MED6015 Swell In Siloxane monomers

| Siloxane monomer | % Change in Diameter | MW Wt. (in Daltons) | HLB Value | Structure No. |
|---|---|---|---|---|
| MCR-M11 | 19% | 800-1000 | 0 | VII |
| DMS-500 | 33% | 500 | 0 | VIII |
| DMS-700 | 25% | 700 | 0 | VIII |

The molecular structures of each of the siloxane monomers listed in Table 3 other than X22-1640 and X22-1662, which were previously provided, are as follows:

Example 5: Cross-Linking of Silicone Elastomer with Silicone Hydrogel

As indicated in Example 1, the polymerizable composition for comfilcon A when double-cast molded on a silicone elastomer (MED6015) did not yield delamination-resistant hybrid contact lenses. We were, however, able to achieve a delamination-resistant bond between the silicone elastomer layer and the silicone hydrogel layer using the double-cast molding method described in Example 1, with the exception that the silicone hydrogel was thermally cured instead of UV-cured, by adding to the comfilcon A polymerizable composition a vinyl terminated poly divinyl dimethyl siloxane (DMS-700), a platinum catalyst (Pt(II)), a thermal initiator (Vazo) and a vinyl-functionalized cross-linking agent (tetrakis dimethylsiloxy silane (TDSS)). Column 1 of Table 4 below shows the additional components and amounts (in % by weight of total polymerizable composition) added to the comfilcon A composition. Whether a delamination-resistant bond formed between the silicone hydrogel layer and silicone elastomer layer is indicated in columns 2 and 3 of Table 4.

TABLE 4

| Added Components (by wt %) | Number of delaminated lenses | |
|---|---|---|
| | after hydration in water | after extraction with EtOH |
| 1.5% Vazo | 1 of 15 | 15 of 15 |
| 10% DMS-700, 1.5% Vazo | 0 o 16 | 16 of 16 |
| 20% DMS-700, 1.5% Vazo | 3 of 16 | 16 or 16 |
| 10% DMS-700, 1.5% Vazo, Pt(II) & 0.09% TDSS | 1 of 8 | 1 of 8 |
| 20% DMS-700, 1.5% Vazo, Pt(II) & 0.09% TDSS | 8 of 12 | 8 of 12 |

Example 6: Decreasing Percent Swell of Silicone Reduces Deformation of Silicone Elastomer-Silicone Hydrogel Hybrid Lenses About 95 uL silicone elastomer (MED-6015, NuSil) was dispensed into oxygen plasma-treated female polypropylene contact lens mold members. A male mold member made from un-treated polypropylene was fitted on top of each female mold to provide a first mold assembly that was placed in an oven at a temperature set at 100° C. for 40 minutes. Upon opening the mold assemblies, the partially-cured elastomer layer remained attached to the female mold members. Next, about 95 uL of a polymerizable composition of Formulation A, Formulation B (increased cross-linker), or Formulation C (added diluent) as shown in Table 5, was dispensed into each female mold member on top of the elastomer layer. The % swell of Formulations A, B, and C, were 22%, 8%, and −1%, respectively.

A male mold member was placed in contact with each of the female mold members containing the cured elastomer and the polymerizable composition to form a second mold assembly. The mold assemblies were cured. After curing, the hybrid lenses were removed from the molds and subjected to extraction and hydration. Lenses made with polymerizable silicone hydrogel Formulation B yielded fewer deformed lenses than those made with polymerizable silicone hydrogel Formulation A. Lenses made with Formulation C were not deformed.

TABLE 5

| | Formulation | | |
|---|---|---|---|
| Component | A Parts | B Parts | C Parts |
| triethyleneglycol divinyl ether | 0.1 | 0.1 | 0.1 |
| 2-Allyloxy ethanol | 1.2 | 1.2 | 1.2 |
| ethylene glycol dimethacrylate | 0.4 | 4.4 | 0.4 |
| 1622 | 26 | 26 | 26 |
| 1640 | 9 | 9 | 9 |
| N-vinyl-N-methylacetamide | 42 | 42 | 42 |
| ethylene glycol methyl ether methacrylate | 6 | 6 | 6 |
| methyl methacrylate | 13 | 13 | 13 |
| Reactive Blue 246 | 0.01 | 0.01 | 0.01 |
| triphenyl phosphine | 0.4 | 0.4 | 0.4 |
| Norbloc 7966 | 0.8 | 0.8 | 0.8 |
| 2,2'-Azobis(2-methylpropionitrile) | 0.4 | 0.4 | 0.4 |
| PDMS-co-PEG | 0 | 0 | 22 |

The entire contents of all cited references in this disclosure, to the extent that they are not inconsistent with the present disclosure, are incorporated herein by reference.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The present invention includes the following aspects/embodiments/features in any order and/or in any combination:

1. A silicone elastomer-silicone hydrogel hybrid contact lens comprising a silicone elastomer layer comprising an anterior side and a posterior side; and a silicone hydrogel layer adhered to the posterior side of the silicone elastomer layer, wherein a delamination-resistant bond is present between the silicone elastomer layer and the silicone hydrogel layer, and wherein the silicone hydrogel layer has a percent swell of about −5% up to about 20%.
2. The contact lens of 1, wherein the silicone hydrogel layer has a center thickness of at least 5 μm, or at least 10 μm.
3. The contact lens of 1 or 2, wherein the silicone hydrogel layer has a percent swell of about −5% or 0% up to about 10%, or 15%.
4. The contact lens of any one of 1 to 3, wherein the delamination-resistant bond is formed by an elastomer-swellable component of the silicone hydrogel layer that interpenetrates into the silicone elastomer layer.
5. The contact lens of 4, wherein the elastomer-swellable component has a hydrophilic-lipophilic balance (HLB) value of up to 4, or a molecular weight of up to 1,200 daltons (Da), or both an HLB value of up to 4 and a molecular weight of up to 1,200 Da.
6. The contact lens of 4 or 5, wherein the delamination-resistant bond comprises an interpenetrating polymer network formed by the elastomer-swellable component.
7. The contact lens of any one of 1 to 6, wherein the delamination-resistant bond comprises a covalent attachment between a vinyl-containing cross-linking agent of the silicone hydrogel layer with the silicone elastomer layer.
8. The contact lens of 7, wherein the vinyl-containing cross-linking agent comprises a divinyl siloxane.
9. The contact lens of any one of 1 to 3, wherein the delamination resistant bond comprises predetermined appendages or channels on the posterior side of the silicone elastomer layer that interlock with corresponding appendages or channels formed in the silicone hydrogel layer.
10. The contact lens of any one of 1 to 3, wherein the delamination resistant bond comprises a plasma bond.
11. The contact lens of any one of 1 to 10, wherein the silicone hydrogel layer forms a circumferential skirt around the silicone elastomer layer.
12. The contact lens of any one of 1 to 12, wherein the silicone elastomer layer forms the anterior surface of the contact lens and is treated to provide a hydrophilic surface.
13. The contact lens of any one of 1 to 12, wherein the silicone elastomer layer is treated with plasma or a hydrophilic coating.
14. The contact lens of any one of 1 to 13, further comprising an object embedded within the silicone elastomer layer or adhered to a side of the silicone elastomer layer.
15. The contact lens of 14, wherein the object is a variable focus lens or an electronic component.
16. The contact lens of any one of 1 to 15 that can be pushed up by at least 1, 2, 4 or 5 mm and has a push-up speed recovery speed of at least 0.1 mm/s, 0.2 mm/s, or 0.4 mm/s up to about 2 mm/s, or 3 mm/s or 4 mm/s, as determined by slit lamp evaluation using a standard push-up test.
17. A method of manufacturing a silicone elastomer-silicone hydrogel hybrid contact lens comprising cast molding a first curable composition in a first mold assembly to form a first layer of the silicone elastomer-silicone hydrogel hybrid contact lens, wherein the first mold assembly comprises a first mold member defining an anterior side of the first layer and a second mold member defining the posterior side of the first layer; disassembling the first mold assembly to provide the first layer adhered to only one of the first and second mold members; cast molding a second curable composition in a second mold assembly to form a second layer of the silicone elastomer-silicone hydrogel hybrid contact lens, wherein the second mold assembly comprises the mold member to which the first layer is adhered and a third mold member; and disassembling the second mold assembly to provide a silicone elastomer-silicone hydrogel hybrid contact lens comprising: i) a silicone elastomer layer comprising an anterior side and a posterior side; and ii) a silicone hydrogel layer adhered to the posterior side of the silicone elastomer layer by a delamination-resistant bond between the silicone elastomer layer and the silicone hydrogel layer.
18. The method of 17, wherein the first layer is the silicone elastomer layer and the delamination-resistant bond is formed by an elastomer-swellable component of the silicone hydrogel layer that interpenetrates into the silicone elastomer layer.

19. The method of 17, wherein the delamination-resistant bond comprises predetermined appendages or channels on the posterior side of the silicone elastomer layer that interlock with corresponding appendages or channels formed in the silicone hydrogel layer.

20. The method of any one of 17 to 19, wherein the silicone hydrogel layer has a net swell of about −5% up to about 20%, or about 0% to about 10%.

What is claimed is:

1. A silicone elastomer-silicone hydrogel hybrid contact lens comprising:
   a) a silicone elastomer layer comprising an anterior side and a posterior side; and
   b) a silicone hydrogel layer adhered to the posterior side of the silicone elastomer layer; wherein a delamination-resistant bond is present between the silicone elastomer layer and the silicone hydrogel layer, and wherein the silicone hydrogel layer has a percent swell of from about −5% to less than 10%.

2. The contact lens of claim 1, wherein the silicone hydrogel layer has a center thickness of at least 5 µm.

3. The contact lens of claim 1, wherein the silicone hydrogel layer has a center thickness of at least 10 µm.

4. The contact lens of claim 1, wherein the silicone hydrogel layer has a percent swell of about −1% up to about 5%.

5. The contact lens of claim 1, wherein the silicone hydrogel layer is formed by curing a polymerizable composition comprising an elastomer-swellable monomer capable of swelling the silicone elastomer by at least 5% as determined by submerging an 11.5 mm×100 disk of the silicone elastomer in the elastomer-swellable monomer for 24 hours at 20-25° C. and measuring at least a 5% increase in diameter of the disk, and wherein the delamination-resistant bond is formed by the elastomer-swellable monomer.

6. The contact lens of claim 5, wherein the elastomer-swellable monomer has a hydrophilic-lipophilic balance (HLB) value of up to 4, or a molecular weight of up to 1,200 daltons (Da), or both an HLB value of up to 4 and a molecular weight of up to 1,200 Da.

7. The contact lens of claim 5, wherein the delamination-resistant bond comprises an interpenetrating polymer network formed by the elastomer-swellable monomer.

8. The contact lens of claim 1, wherein the delamination-resistant bond comprises a covalent attachment between a vinyl-containing cross-linking agent of the silicone hydrogel layer with the silicone elastomer layer.

9. The contact lens of claim 8, wherein the vinyl-containing cross-linking agent comprises a divinyl siloxane.

10. The contact lens of claim 1, wherein the delamination resistant bond comprises predetermined appendages or channels on the posterior side of the silicone elastomer layer that interlock with corresponding appendages or channels formed in the silicone hydrogel layer.

11. The contact lens of claim 1, wherein the delamination resistant bond comprises a plasma bond.

12. The contact lens of claim 1, wherein the silicone hydrogel layer forms a circumferential skirt around the silicone elastomer layer.

13. The contact lens of claim 1, wherein the silicone elastomer layer forms the anterior surface of the contact lens and is treated to provide a hydrophilic surface.

14. The contact lens of claim 13, wherein the silicone elastomer layer is treated with plasma or a hydrophilic coating.

15. The contact lens of claim 1, further comprising an object embedded within the silicone elastomer layer or adhered to a side of the silicone elastomer layer.

16. The contact lens of claim 15, wherein the object is a variable focus lens.

17. The contact lens of claim 15, wherein the object is an electronic component.

18. The contact lens of claim 1 that can be pushed up by at least 2 mm and has a push-up speed recovery speed of at least 0.2 mm/s as determined by slit lamp evaluation using a push-up test.

19. A method of manufacturing a silicone elastomer-silicone hydrogel hybrid contact lens comprising:
   a) cast molding a first curable composition in a first mold assembly to form a first layer of the silicone elastomer-silicone hydrogel hybrid contact lens, wherein the first mold assembly comprises a first mold member defining an anterior side of the first layer and a second mold member defining the posterior side of the first layer;
   b) disassembling the first mold assembly to provide the first layer adhered to only one of the first and second mold members;
   c) cast molding a second curable composition in a second mold assembly to form a second layer of the silicone elastomer-silicone hydrogel hybrid contact lens, wherein the second mold assembly comprises the mold member to which the first layer is adhered and a third mold member; and
   d) disassembling the second mold assembly to provide a silicone elastomer-silicone hydrogel hybrid contact lens comprising: i) a silicone elastomer layer comprising an anterior side and a posterior side; ii) a silicone hydrogel layer adhered to the posterior side of the silicone elastomer layer by a delamination-resistant bond between the silicone elastomer layer and the silicone hydrogel layer and wherein the silicone hydrogel layer has a percent swell of from about −5% to less than 10%.

20. The method of claim 19, wherein the first layer is the silicone elastomer layer and the delamination-resistant bond is formed by an elastomer-swellable monomer of the silicone hydrogel layer that interpenetrates into the silicone elastomer layer.

21. The method of claim 19, wherein the delamination-resistant bond comprises predetermined appendages or channels on the posterior side of the silicone elastomer layer that interlock with corresponding appendages or channels formed in the silicone hydrogel layer.

22. The method of claim 19, wherein the silicone hydrogel layer has a net swell of about −5% up to about 20%.

* * * * *